(12) United States Patent
Tang et al.

(10) Patent No.: US 7,840,071 B2
(45) Date of Patent: Nov. 23, 2010

(54) METHOD AND APPARATUS FOR IDENTIFYING REGIONS OF DIFFERENT CONTENT IN AN IMAGE

(75) Inventors: Yichuan Tang, Mississauga (CA); Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1015 days.

(21) Appl. No.: 11/609,718

(22) Filed: Dec. 12, 2006

(65) Prior Publication Data

US 2008/0137954 A1 Jun. 12, 2008

(51) Int. Cl.
*G06K 9/34* (2006.01)
*H04N 1/40* (2006.01)
(52) U.S. Cl. ....................... 382/176; 358/462
(58) Field of Classification Search ............... 382/176; 356/462
See application file for complete search history.

(56) References Cited

U.S. PATENT DOCUMENTS

| | | | | |
|---|---|---|---|---|
| 4,447,830 | A | * | 5/1984 | Stoffel ..................... 358/462 |
| 4,893,188 | A | * | 1/1990 | Murakami et al. ........... 358/2.1 |
| 5,379,130 | A | | 1/1995 | Wang et al. |
| 5,568,571 | A | | 10/1996 | Willis et al. |
| 5,742,703 | A | | 4/1998 | Lin et al. |
| 5,854,854 | A | * | 12/1998 | Cullen et al. .............. 382/176 |
| 6,178,010 | B1 | | 1/2001 | Takenouchi et al. |
| 6,195,459 | B1 | | 2/2001 | Zhu |
| 6,289,122 | B1 | * | 9/2001 | Karidi ..................... 382/176 |
| 6,512,848 | B2 | * | 1/2003 | Wang et al. ............... 382/176 |
| 6,628,833 | B1 | * | 9/2003 | Horie ....................... 382/173 |
| 6,731,800 | B1 | | 5/2004 | Barthel et al. |
| 6,744,918 | B1 | | 6/2004 | Caldato et al. |
| 6,778,700 | B2 | | 8/2004 | Karidi et al. |
| 2003/0128396 | A1 | * | 7/2003 | Fan ........................ 358/3.27 |
| 2004/0042659 | A1 | | 3/2004 | Guo et al. |
| 2004/0076328 | A1 | | 4/2004 | Li |
| 2004/0175037 | A1 | | 9/2004 | Guleryuz |
| 2004/0223643 | A1 | | 11/2004 | Irwin |
| 2004/0240736 | A1 | | 12/2004 | Karidi et al. |
| 2004/0240737 | A1 | | 12/2004 | Lim et al. |
| 2005/0002566 | A1 | | 1/2005 | Di Federico et al. |
| 2008/0152189 | A1 | * | 6/2008 | Van Leest .................. 382/100 |

* cited by examiner

*Primary Examiner*—Brian P Werner
*Assistant Examiner*—Barry Drennan
(74) *Attorney, Agent, or Firm*—Mark P. Watson (57) ABSTRACT

A method of identifying regions of different content in an image comprises dividing image data into a plurality of pixel blocks, extracting features of the pixel blocks and classifying the content of the pixel blocks based on extracted features. Extracting comprises, for each pixel block, convolving a magic square filter with the pixels of the pixel block and summing the results, and calculating the percentage of background pixels in the pixel block. The magic square filter is a 3×3 kernel that has a specific selectivity towards the statistical appearance and geometric alignment of a document based text of various fonts, sizes and styles. The complete sum of the magic square filter, as well as the sum of the rows, columns and diagonals of the magic square filter are zero.

19 Claims, 8 Drawing Sheets

| 0.2000 | -0.2667 | 0.0667 |
| -0.1333 | 0.0000 | 0.1333 |
| -0.0667 | 0.2667 | -0.2000 |

METHOD AND APPARATUS FOR IDENTIFYING REGIONS OF DIFFERENT CONTENT IN AN IMAGE

FIELD OF THE INVENTION

The present invention relates generally to image processing and in particular, to a method and apparatus for identifying regions of different content in an image.

BACKGROUND OF THE INVENTION

Image scanning devices, such as for example, photocopiers, facsimile machines, all-in-one printers with scan and copy functions etc. that scan documents and output corresponding images are well known in the art. In some instances, the image of a scanned document generated by the image scanning device may be of less than desired quality. When this occurs, prior to outputting the image of the scanned document, it may be necessary or beneficial to enhance the image to improve image quality to correct defects and/or to compensate for artifacts introduced during the image scanning process. For example, smoothing filters, sharpening filters, de-noising filters etc. may be applied to the image data prior to image output. Enhancing images in this manner has however, proven to be satisfactory only when the images include consistent content (i.e. are of one data type). Unfortunately, images comprising regions of different content, such as for example text content and non-text content regions, pose a particular challenge due to the fact that many image enhancing techniques, although beneficial when applied to one type of image content, are detrimental when applied to another type of image content. As a result, to achieve the desired image enhancement, different image enhancing techniques may need to be applied to different content regions of the images.

Techniques for identifying different content regions of digital images have been considered. For example, U.S. Pat. No. 6,289,122 to Karidi discloses a method for detecting text and non-text areas in an image. Initially, the intensity depth of the image is reduced, and the image is divided into blocks. A number of statistics are determined for each block, including the total luminance across all pixels, the darkest and lightest pixel value and the number of white and black pixels. A block "type" (such as "not text", "small text" or "white block") is determined based on these statistics. The total intensity is then determined for each block, along with whether the block is a color block or a neutral block. A moving window is used to examine adjacent sets of blocks to determine which blocks represent text content and which blocks represent non-text content. Sets of nine adjacent blocks are examined and a determination of whether the middle block needs to be adjusted is made.

U.S. Pat. No. 6,195,459 to Zhu discloses a method for detecting text and non-text portions of a greyscale image. The greyscale image is initially partitioned into blocks of a pre-determined size. A set of wavelet domain features, preferably at least six, is extracted from each block and a feature vector is generated. Each block is classified as either representing text or image content based on its feature vector as well as member functions and a set of previously-determined fuzzy rules.

U.S. Patent Application Publication No. 2005/0002566 to Di Federico et al. discloses a method of discriminating between text and non-text regions of an image. A matrix of luminance values of the pixels of the image is generated and the matrix is divided into blocks. Luminance gradients of the luminance values of the blocks are determined and a gradient matrix is formed. The gradient matrix is analyzed to detect blocks of the same content type. Blocks of the same content type are then clustered into respective natural and synthetic regions of the image.

U.S. Pat. No. 5,379,130 to Wang et al. discloses a text/image separation method wherein a three-by-three pixel kernel is used to distinguish pixels in an image that are likely text and not image content. If a particular pixel represents an edge, an edge-sharpening procedure is performed to distinguish the edge. If the particular pixel does not represent an edge, its value is not adjusted.

U.S. Pat. No. 5,568,571 to Willis et al. discloses a method and system for processing a greyscale image. A greyscale histogram is initially generated for the image. The pixels which have intensity values falling in the top 5% and the bottom 5% of the greyscale histogram values are discarded to eliminate noise. The remaining pixels are divided into thirty (30) sub-groups. A greyscale average is calculated for each sub-group. Each of the pixels is reassigned the greyscale average for the sub-group of which they form a part. Text components are separated from non-text components using a three-by-three kernel to identify edges deemed to represent text.

U.S. Pat. No. 6,178,010 to Takenouchi et al. discloses a method for enhancing an image, wherein text and image areas are initially identified using known methods. The text and image areas are then enhanced using methods appropriate for those sections.

U.S. Pat. No. 6,744,918 to Caldato et al. discloses a method of enhancing a source image wherein the image is analyzed to distinguish between color and neutral areas, that is, between image content and text or drawing content. During the method, a first image is generated from the color portions of the source image. A second image is generated from the neutral portions of the source image. The first image is compressed more than the second image.

U.S. Pat. No. 6,778,700 to Karidi et al. discloses a method for segmenting a document image into text and non-text portions. A set of three-by-three pixel kernels are employed to detect steep changes in intensity (i.e. edges or ramps). Regions bordered by two ramps of opposite orientation (i.e. troughs) are identified. The troughs are deemed to represent strokes of a character. For each stroke, the width and skeleton are determined. The contrast of a nine-by-nine pixel region around each pixel is then examined, along with the width of adjacent strokes, to determine if the pixel forms part of a character. A thin, black outline is drawn around detected strokes to improve text identification performed by another system.

U.S. Patent Application Publication No. 2004/0042659 to Guo et al. discloses a method of segmenting a document image into regions of text and halftones. A color space transformation is applied to the document image. In particular, the document image is transformed from RGB color space to HSV color space. The texture of the document image is identified by looking at the texture features of each color channel, and then noise reduction is applied. Bounding boxes within the document image are identified by examining runs of pixels of either text or halftones.

U.S. Patent Application Publication No. 2004/0076328 to Li discloses a method for enhancing data of a document image, wherein contextual information is used to classify a pixel as part of a character or figure. The document image is scanned to detect a regular, recurring pattern of peaks and valleys denoting background and foreground. A three-by-three pixel region around pixels identified as being local maxima or minima is examined. If the three pixels along one side of the pixel region have increasing greyscale levels in one direction and the three pixels along the opposite side of the pixel region have increasing greyscale levels in the opposite direction, the center pixel is deemed to form part of a pattern that bridges the two sides.

U.S. Patent Application Publication No. 2004/0175037 to Guleryuz discloses a method for segmenting document images. The document image is blurred with a first filter to generate a first blurred image, and is also separately blurred with a second filter to generate a second blurred image. Edges are detected in both the first and second blurred images. The detected edges from both blurred images are combined, and it is determined whether pixels along the detected edges represent a halftone region.

U.S. Patent Application Publication No. 2004/0223643 to Irwin discloses a method for distinguishing text regions from non-text regions in an image. An edge group is identified that includes pixels from non-text regions that are adjacent to pixels from text regions. Text pixels along the edge group are preserved. Pixels in both the text and non-text regions of the image are smoothed.

U.S. Patent Application Publication No. 2004/0240737 to Lim et al. discloses a method for enhancing a document image, wherein character blocks and background blocks are identified in the document image. An average energy ratio of the character blocks is calculated and compared to a threshold to determine whether the document image is blurred. If the document image is not blurred, the document image is classified into text and background portions. The greyscale values of the pixels in the text portions of the document image are compared to a threshold. Those pixels with greyscale values below the threshold are set to a brightness value associated with characters, and those pixels with greyscale values above the threshold are set to a brightness value associated with background. Character recognition is then performed on the thresholded text portions of the document image.

Although the above references disclose techniques for identifying different content regions in images, improvements are desired. As will be appreciated, in most environments, high speed image processing is required. Images of scanned documents must therefore be processed on-the-fly to avoid the need to re-scan documents. Processing image data on-the-fly however, presents challenges. During scanning only a small band of image data may be available for processing at a given time resulting in an absence of contextual image information. This lack of both image data and contextual information combined with the need for high speed image processing renders conventional techniques for identifying different content regions in images unsatisfactory.

It is therefore an object of the present invention to provide a novel method and apparatus for identifying regions of different content in an image.

SUMMARY OF THE INVENTION

Accordingly, in one aspect there is provided a method of identifying regions of different content in an image comprising:

dividing image data into a plurality of pixel blocks;
extracting features of said pixel blocks; and
classifying the content of said pixel blocks based on extracted features.

In one embodiment, the extracted features are based on pixel block statistical information. The extracting comprises for each pixel block, convolving a magic square filter with the pixels of the pixel block and summing the results and calculating the percentage of background pixels in the pixel block. The extracting may further comprise for each pixel block, calculating the edge density of the pixel block, calculating the number of uniform rectangles in the pixel block and calculating the average saturation of the pixel block.

The classifying is performed in a series of cascading stages with later stages being employed only when earlier stages are unable to classify the pixel blocks. During classifying, pixel blocks are identified as containing text content or non-text content. The classifying comprises initially classifying the content of each pixel block based on the magic square filter convolving and summing result and the percentage of background pixels. In the event that the content of a pixel block cannot be classified to the desired level of confidence, the content of the pixel block is subsequently classified based on at least one of the calculated edge density and average saturation. In the event that the content of a pixel block still cannot be classified to the desired level of confidence during subsequent classification, the content of the pixel block is further subsequently classified based on the calculated edge density and the number of uniform rectangles.

If desired, following classification of the pixel block content, connected pixel blocks identified as containing the same content type are aggregated and borders of pixel blocks identified as containing text content are adjusted to inhibit text from being truncated.

According to another aspect there is provided an apparatus for identifying regions of different content in an image comprising:

a feature extractor dividing image data into a plurality of pixel blocks and extracting features of said pixel blocks; and
a classifier classifying the content of said pixel blocks based on extracted features.

According to yet another aspect there is provided a computer readable medium embodying a computer program for identifying regions of different content in an image, said computer program comprising:

computer program code for dividing image data into a plurality of pixel blocks;
computer program code for extracting features of said pixel blocks; and
computer program code for classifying the content of said pixel blocks based on extracted features.

BRIEF DESCRIPTION OF THE DRAWINGS

Embodiments will now be described more fully with reference to the accompanying drawings in which.

DETAILED DESCRIPTION OF THE EMBODIMENTS

Figure 1:
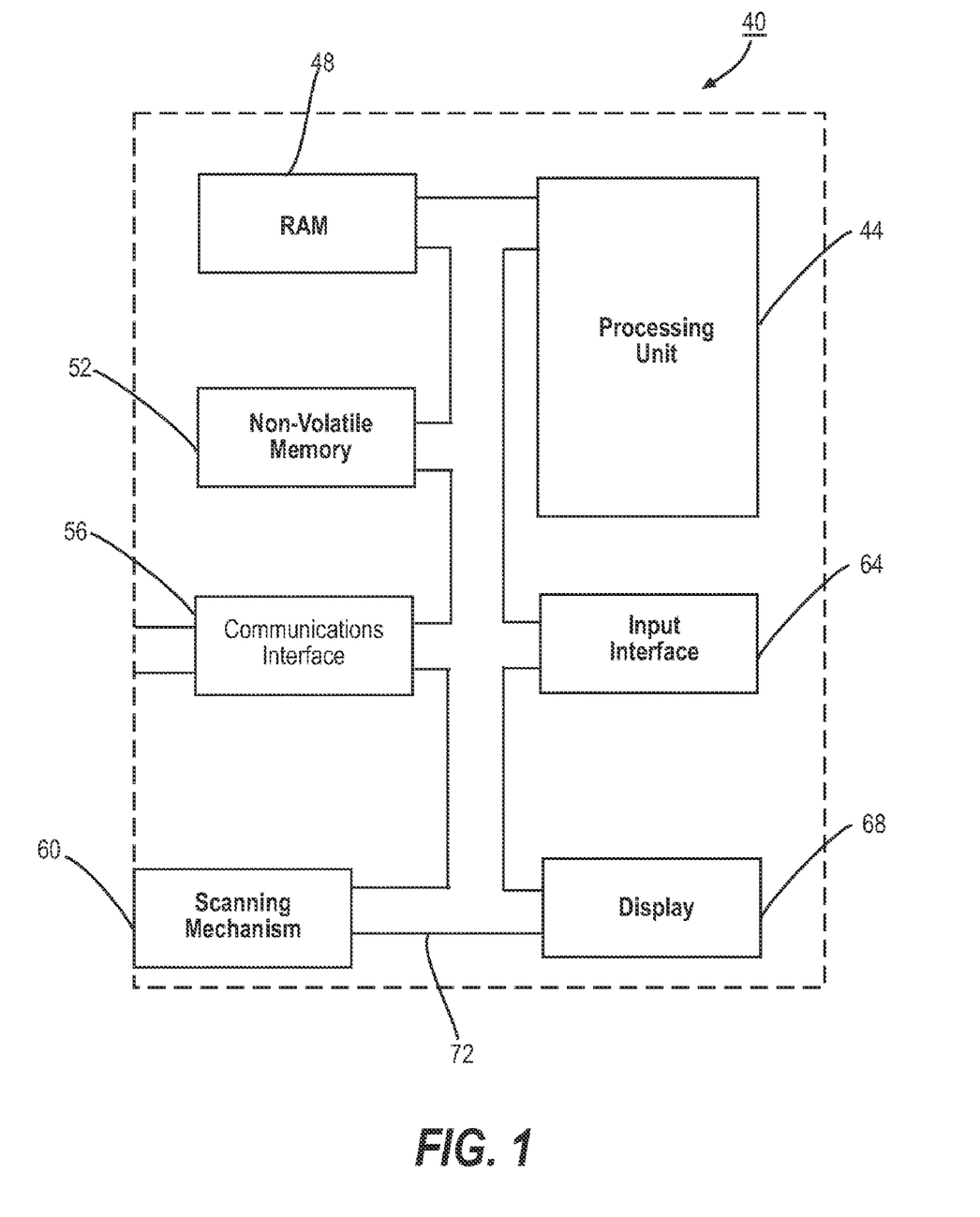
FIG. 1 is a schematic representation of an image scanning device.

Turning now to FIG. 1, an image scanning device such as for example, a photocopier, a facsimile machine, an all-in-one printer having a scan and copy function or the like, is shown and is generally identified by reference numeral 40. As can be seen, the image scanning device 40 comprises a processing unit 44, random access memory ("RAM") 48, non-volatile memory 52, a communications interface 56, a scanning mechanism 60, an input interface 64 and a display 68, all in communication over a local bus 72. The input interface 64 allows user input in order to enable a user to interact with options or images presented on the display 68 and to control the operation of the image scanning device 40. In addition to the software that is executed by the processing unit 44 to allow the image scanning device 40 to operate in a conventional manner, the non-volatile memory 52 also stores a content type identifying application and image enhancing applications. The content type identifying application in this embodiment identifies text and non-text regions of a document image. The image enhancing applications allow the identified text and non-text regions to be enhanced to improve the quality of the document image.

Figure 2:
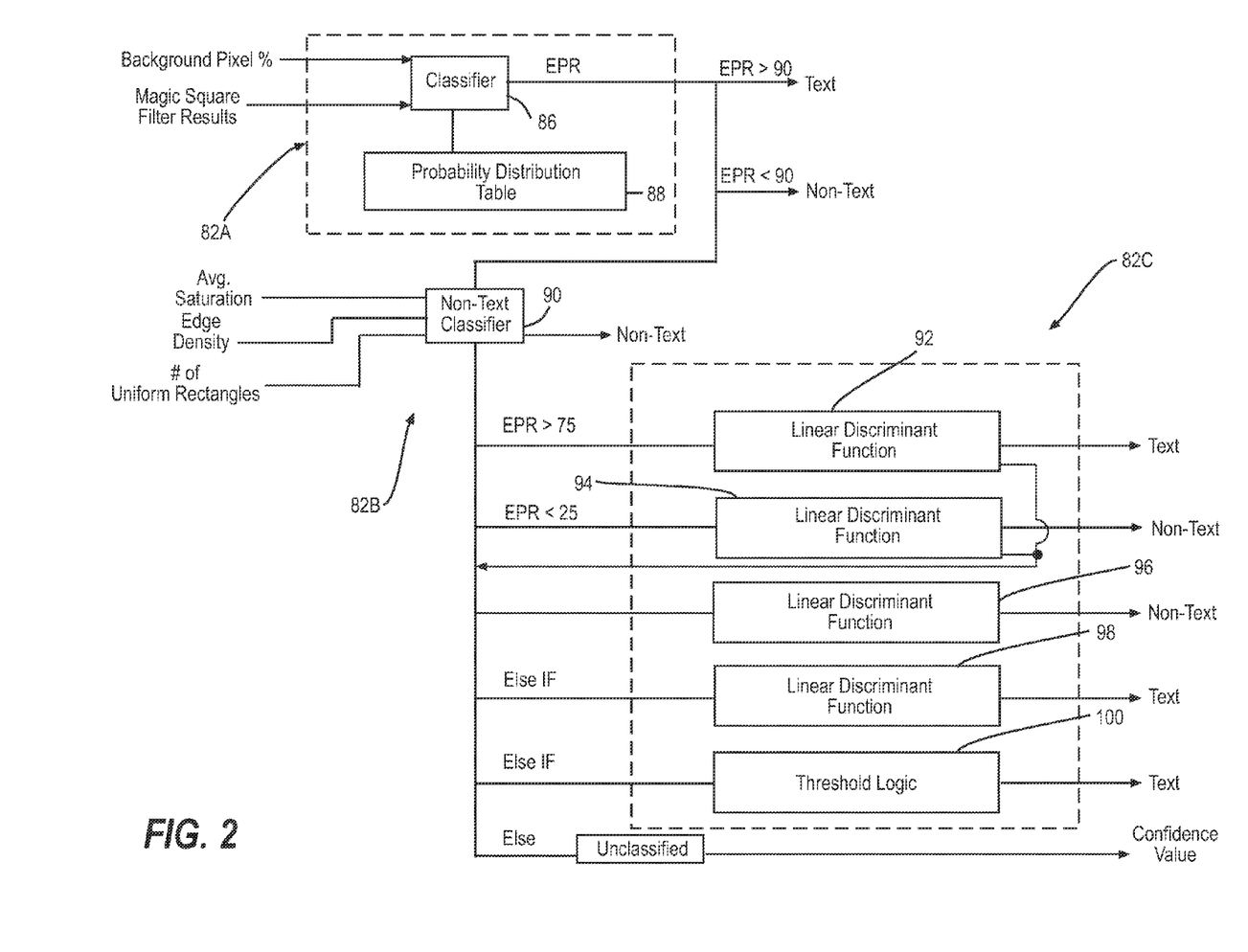
FIG. 2 is a schematic representation of a hybrid classifier.

The content type identifying application employs a hybrid neural network classifier 80 as shown in FIG. 2 that examines features extracted from the document image to identify text and non-text regions of the document image. In this embodiment, the six (6) features used by the hybrid classifier 80 to identify the type of content comprise the results of a magic square filter, the percentage of background pixels, the number of uniform rectangles, edge density, and average saturation or colorfulness. The edge density, background pixel percentage, average saturation and uniform rectangle features complement the magic square filter due to their ability to identify image content that is not readily identified by the magic square filter.

As can be seen in FIG. 2, the hybrid classifier 80 comprises a plurality of cascaded classifier stages 82A, 82B and 82C. The first classifier stage 82A comprises a single classifier 86 that receives the magic square filter results and the background pixel percentage. The classifier 86 also communicates with a trained, two-dimensional, thirty (30) by thirty (30), full-joint probability distribution table 88. The second classifier stage 82B comprises a non-text classifier 90. Classifier 90 receives the average saturation, the edge density and the number of uniform rectangles as well as the output of the classifier 86, if the classifier 86 is unable to classify content type to a desired level of confidence. The third classifier stage 82C comprises four (4) linear discriminant functions 92 to 98 and threshold logic 100.

The first classifier stage 82A is initially employed to identify text and non-text regions of the document image. If the first classifier stage 82A is able to classify the text and non-text regions of the document image with a desired level of confidence, the second and third classifier stages 82B and 82C are not used. If the first classifier stage 82A is unable to classify regions of the document image with the desired level of confidence, the second classifier stage 82B is employed. If the second classifier stage 82B is able to classify all of the regions of the document image that could not be classified by the first classifier stage 82A with the desired level of confidence, the third classifier stage 82C is not used. If the second classifier stage 82B is unable to classify all of these regions with the desired level of confidence, the third classifier stage 82C is employed. The features extracted from the document image that are used by the classifier stages 82A, 82B and 82C are only extracted from the document image when the classifier stages are employed. This of course helps to reduce processing allowing regions of different content in the document image to be identified quickly and efficiently.

Figure 3:
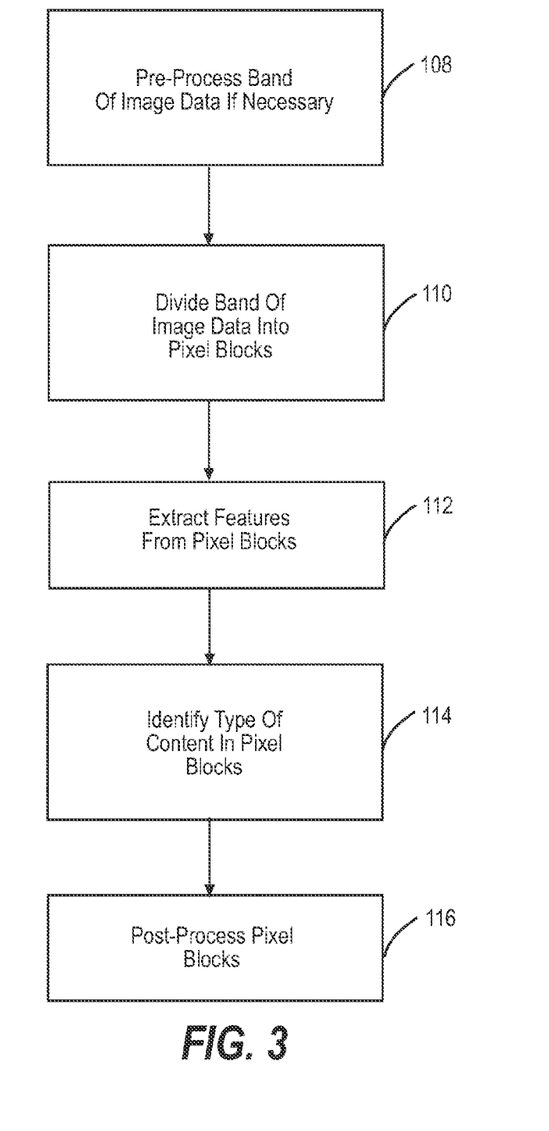
FIG. 3 is a flowchart of the general method of identifying regions of different content of an image employed by the image scanning device of FIG. 1.

The operation of the image scanning device 40 as it relates to identifying regions of different content in the document image will now be described with reference to FIG. 3. For the purpose of this description, it will be assumed that the content type identifying application has been loaded into the RAM 48 and is being executed by the processing unit 44. As a document is being scanned by the scanning mechanism 60, bands of image data are generated by the scanning mechanism 60 and conveyed to the processing unit 44. In this embodiment, each band of the image data comprises twenty-four (24) rows of pixels. Upon receipt of each band of image data by the processing unit 44, the content type identifying application initially pre-processes the band of image data to reduce the resolution of the image data (step 108), if necessary, and then divides the band of image data into 24×24 pixel blocks (step 110). Each pixel block is then subjected to feature extraction (step 112) and the type of content in the pixel block is identified using the hybrid classifier 80 (step 114). The content type identification results are then post-processed (step 116) thereby completing the content type identifying process.

Figure 4:
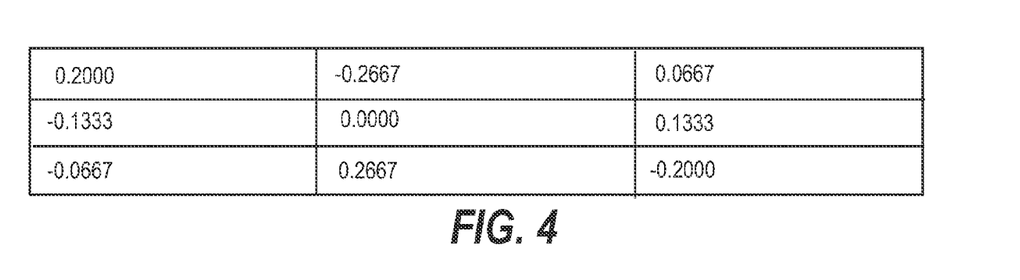
FIG. 4 is a table showing the values of a magic square filter.

At step 112, for each pixel block, as the hybrid classifier 80 initially only employs the first classifier stage 82 to identify text and non-text regions therein, initially only the features used by the first classifier stage 82 are extracted from the pixel block, namely the results of the magic square filter and the background pixel percentage. In order to generate the magic square filter results, a magic square filter of the form shown in FIG. 4 is applied to the pixel block.

As can be seen, the magic square filter is a 3×3 kernel that has a specific selectivity towards the statistical appearance and geometric alignment of document based text of various fonts, sizes and styles. The complete sum of the magic square filter, as well as the sum of the rows, columns and diagonals of the magic square filter are zero. During feature extraction, each pixel in the pixel block is convolved with the magic square filter and the absolute value of the result is determined. The results for all of the pixels in the pixel block are then summed and recorded. As the magic square filter is mathematically consistent, pixel blocks that are uniform in intensity (i.e. exhibit homogeneity), contain horizontal or vertical bars, or have sides larger than 3 pixels, will yield a low convolution sum. On the other hand, pixel blocks having a high texture pattern or a discrete pattern of small to medium sized text will yield a high convolution sum.

Figure 5:
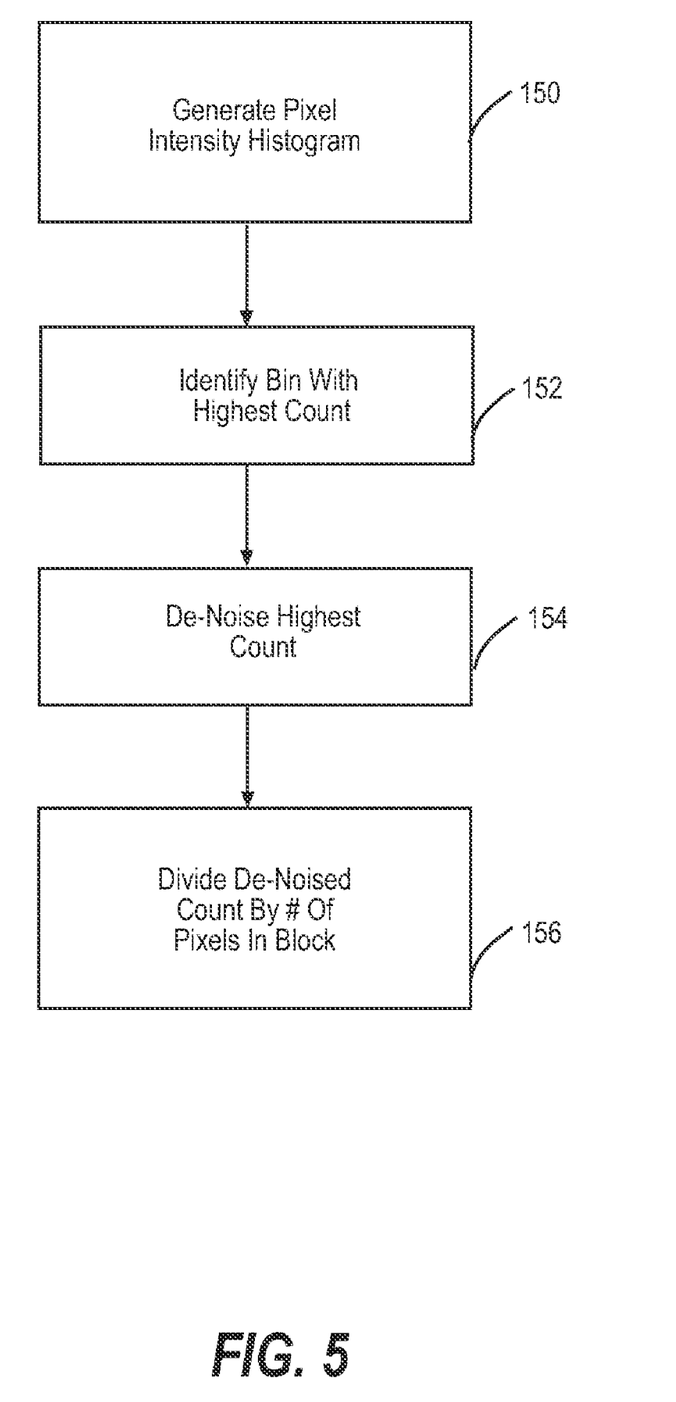
FIG. 5 is a flowchart showing the steps performed during background pixel percentage determination.

The steps performed during determination of the background pixel percentage of the pixel block are shown in FIG. 5. Initially, a pixel intensity histogram for the pixel block is generated (step 150) by examining the intensity of each pixel therein and allocating the pixel to one of one hundred and twenty-eight (128) bins. As will be appreciated, as each pixel has an intensity value in the range of 0 to 256, each bin of the intensity histogram accumulates pixels at two (2) intensity levels. Once generated, the pixel intensity histogram is examined to identify the bin having the highest count (step 152). The value of the highest bin and the values of the bins to the left and right of the highest bin are then added and the resulting sum is divided by three for de-noising purposes (step 154). This result is then divided by the total number of pixels in the pixel block thereby to yield the background pixel percentage (step 156). A high ratio corresponds to a pixel block having a uniform background and a low ratio corresponds to the non-existence of background in the pixel block.

Figure 6:
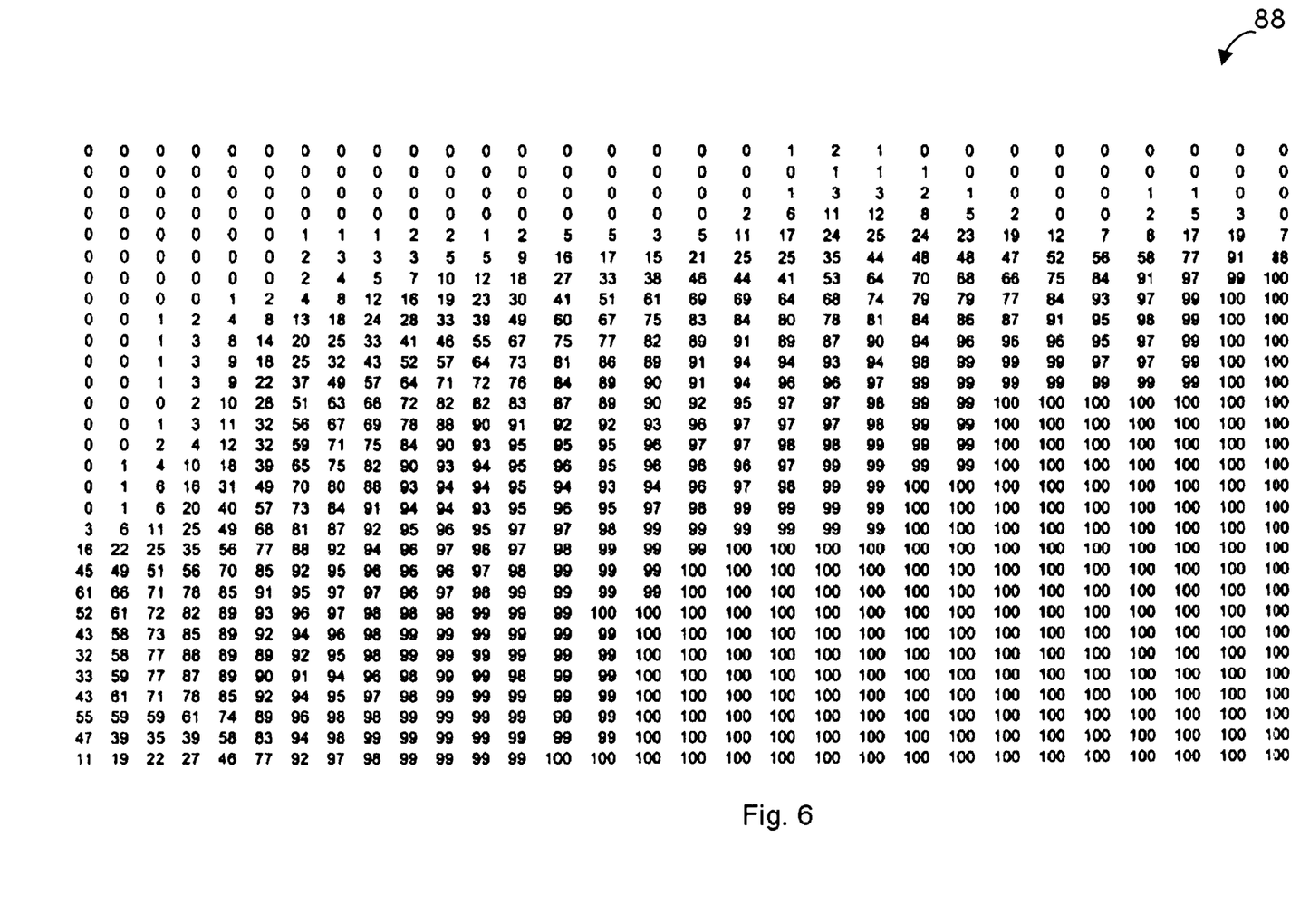
FIG. 6 is a probabilistic distribution table used by the hybrid classifier of FIG. 2.

After the magic square filter results and background pixel percentage have been generated for the pixel block, the magic square filter results and the background pixel percentage are applied to classifier 86 of the first classifier stage 82A. The classifier 86 in turn use the magic square filter results and background pixel percentage to select and extract a probabilistic ratio of text content to non-text content for the pixel block from the probability distribution table 88. FIG. 6 shows an exemplary probabilistic distribution table. The columns of the probabilistic distribution table 88 represent possible background pixel percentages ranging from 0% to 29%. The rows of the probabilistic distribution table 88 represent possible magic square filter results divided by 133.3. The values populating the probabilistic distribution table 88 represent the likelihood that a pixel block having a particular background pixel percentage and magic square filter result includes text or non-text content. A probabilistic distribution table value of one-hundred (100) denotes a pixel block that definitely represents text content while a value of zero (0) denotes a pixel block that definitely represents non-text content. The values populating the probabilistic distribution table 88 are learned by processing a set of training images during a training phase based on input magic square filter and background pixel percentage values.

The probabilistic ratio extracted from the probability distribution table 88 is then compared to text/non-text content threshold levels. If the extracted probabilistic ratio satisfies one of the threshold levels, signifying that the pixel block can be classified as including text content or non-text content with the desired confidence level, the first classifier stage 82A classifies the pixel block accordingly. In this embodiment, the pixel block is deemed to represent text if the extracted probabilistic ratio is greater than ninety (90) and is deemed to represent non-text if the extracted probabilistic ratio is less than ten (10).

If the extracted probabilistic ratio does not meet either of the text/non-text content threshold levels, signifying that the classifier 86 is unable to classify the pixel block with sufficient accuracy, the hybrid classifier 80 employs the second classifier stage 82B. When the hybrid classifier 80 employs the second classifier stage 82B, the additional features used by the second and third classifier stages 82B and 82C are extracted from the pixel block, namely the average saturation, the edge density and the number of uniform rectangles.

During average saturation determination, the saturation of each pixel in the pixel block is calculated according to Equation (1) below:

$$(\max(r,g,b) - \min(r,g,b))/\max(r,g,b) \quad (1)$$

where:

r, g and b are the red, green and blue values, respectively, of the pixels in the pixel block.

The calculated saturations for the pixels are then summed and the mean of the sum is determined thereby to yield the average saturation. A high average saturation value indicates a potential colorful pixel block while a low average saturation value indicates a pixel block comprising of mostly black, grey, or white pixels.

During edge density determination, the edges in the pixel block are firstly determined using a Sobel edge detector. The determined edges are then compared to a threshold level. All edges below the threshold level are considered to be noise and are disregarded. The number of pixels along the remaining edges are then summed and the sum is divided by the total number of pixels in the pixel block to yield an edge density value. A high edge density value corresponds to a pixel block having text content or a high texture, non-text pattern while a low edge density value corresponds to a pixel block having non-text content.

Figure 7:
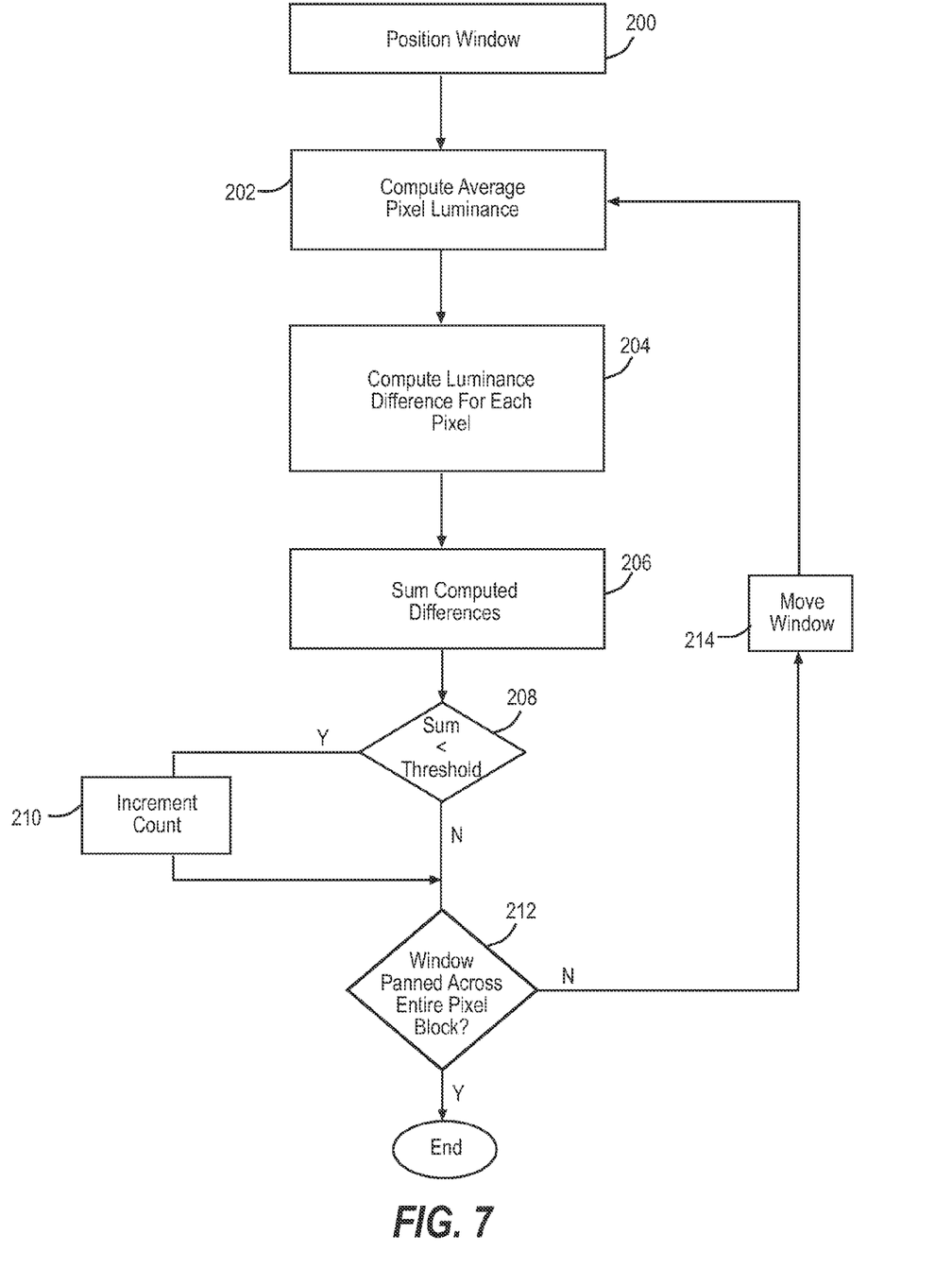
FIG. 7 is a flowchart showing the steps performed during uniform rectangle determination.

During determination of the number of uniform rectangles in the pixel block, a two (2) by twelve (12) pixel window is positioned at the top left corner of the pixel block (see step 200 in FIG. 7). The average luminance value of the pixels within the window is then computed (step 202). The luminance value of each pixel in the window is compared to the average luminance value and the difference is computed (step 204). The computed differences are then summed (step 206) and the sum is compared to a threshold level (step 208). If the sum is less than the threshold level, a count is incremented signifying the existence of a uniform rectangle (step 210) and a check is then made to determine if the window has been panned across the entire pixel block (step 212). At step 208, if the sum is greater than the threshold level the process proceeds directly to step 212. If the window has not been panned across the entire pixel block at step 212, the window is moved (step 214) and the method reverts back to step 202 so that the next 2×12 sub-block of pixels in the pixel block is processed in the above manner. This procedure continues until the window has been panned across the entire pixel block and all 2×12 pixel sub-blocks therein have been processed.

After the average saturation, edge density and uniform rectangle results have been generated, the average saturation, edge density and the number of uniform rectangle results are applied to the non-text classifier 90. The non-text classifier 90 also receives the extracted probabilistic ratio output by the classifier 86. In this case, as the first classifier stage 82A is unable to classify the pixel block as representing text or non-text content, the extracted probabilistic ratio received by the non-text classifier 90 is in the range of 10 to 90. The classifier 90 in turn checks to determine if the average saturation result is greater than sixty-five (65) or if the edge density result is less than 0.08. If either of these conditions holds true, the second classifier stage 82B classifies the pixel block as including non-text content.

If the second classifier stage 82B is unable to classify the pixel block as including non-text content, the third classifier stage 82C is employed. When the third classifier stage 82C is employed, a check is made to determine if the extracted probabilistic ratio conveyed to classifier 90 is greater than seventy-five (75) or less than twenty-five (25). If the extracted probabilistic ratio is greater than seventy-five (75), the linear discriminant function 92 is employed. In this embodiment, the linear discriminant function 92 determines if Equation (2) below holds true signifying that the pixel block includes text content:

$$\text{Edge Density } x(-200) + 96 < \text{Number of Uniform Rectangles} \quad (2)$$

If the linear discriminant function 92 holds Equation (2) to be true, the third classifier stage 82C classifies the pixel block as including text content.

If the extracted probabilistic ratio is less than twenty-five (25), the linear discriminant function 94 is employed and determines if Equation (3) below holds true signifying that the pixel block includes non-text content:

$$\text{Edge Density } x(-300) + 114 > \text{Number of Uniform Rectangles} \quad (3)$$

If the linear discriminant function 94 holds Equation (3) to be true, the third classifier stage 82C classifies the pixel block as including non-text content.

If the linear discriminant function 92 does not hold Equation (2) to be true or if the linear discriminant function 94 does not hold Equation (3) to be true or if the extracted probabilistic ratio is in the range of twenty-five (25) to seventy-five (75), the linear discriminant function 96 is employed. In this embodiment, the linear discriminant function 96 determines if Equation (4) below holds true signifying that the pixel block includes non-text content:

$$\text{Edge Density } x(-300)+84 > \text{Number of Uniform Rectangles} \quad (4)$$

If the linear discriminant function 96 holds Equation (4) to be true, the third classifier stage 82C classifies the pixel block as including non-text content.

If the linear discriminant function 96 does not hold Equation (4) to be true, the linear discriminant function 98 is employed. In this embodiment, the linear discriminant function 98 determines if Equation (5) below holds true signifying that the pixel block includes text content:

$$\text{Edge Density } x(-162.5)+101.25 < \text{Number of Uniform Rectangles} \quad (5)$$

If the linear discriminant function 98 holds Equation (5) to be true, the third classifier stage 82C classifies the pixel block as including text content.

If the linear discriminant function 98 does not hold Equation (5) to be true, the threshold logic 100 checks to determine if the average saturation result is less than twenty-eight (28) and if the edge density result is greater than 0.3. If both of these conditions are satisfied, the third classifier stage 82C classifies the pixel block as including text content. Otherwise the pixel block is not classified and a text/non-text confidence value in the range of one (1) to nine (9) is then output.

Once all of the pixel blocks have been classified or deemed to be unclassifiable, the pixel blocks are post-processed at step 116. During post-processing, each pixel block that is surrounded by eight (8) neighbour pixel blocks is identified. For each such pixel block, the surrounding eight pixel blocks are examined and each pixel block that is surrounded by eight differently classified pixel blocks is identified. The classification of the identified pixel blocks, if any, is switched to match the classification of the eight (8) neighbour pixel blocks.

Also during post-processing, the borders between pixel blocks classified as containing text content and pixel blocks classified as containing non-text content are adjusted to avoid text content from being cut off in an inappropriate manner. During border adjusting, pixel blocks containing text content that are adjacent to pixel blocks containing non-text content are identified. Text-like features adjacent the borders of the text content and non-text content pixel blocks are then identified. To identify such text-like features, the magic square filter is convolved with each pixel in the three columns of the text content pixel block adjacent the border. The absolute values of the results are then summed. If the total sum exceeds a threshold level, then the border of the text content pixel block is moved in the direction which expands the pixel block. This process can be recursive allowing the borders to be moved in one direction repeatedly.

With the pixel block borders adjusted, text content and non-text content regions are identified in the document image by aggregating all connected pixel blocks of the same content type. At this point, as text content and non-text content regions in the document image are identified, image enhancing techniques best suited to the identified content type may be applied to the various regions.

Figure 8:
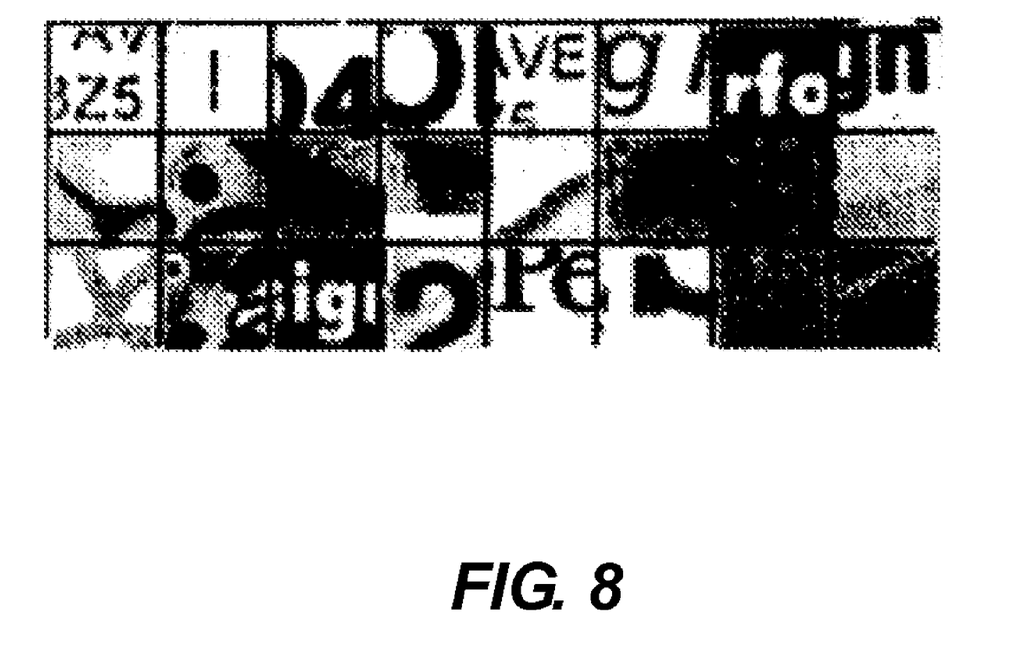
FIGS. 8 and 9 show an image and classification results following processing of the image to identify regions of different content therein.
Figure 9:
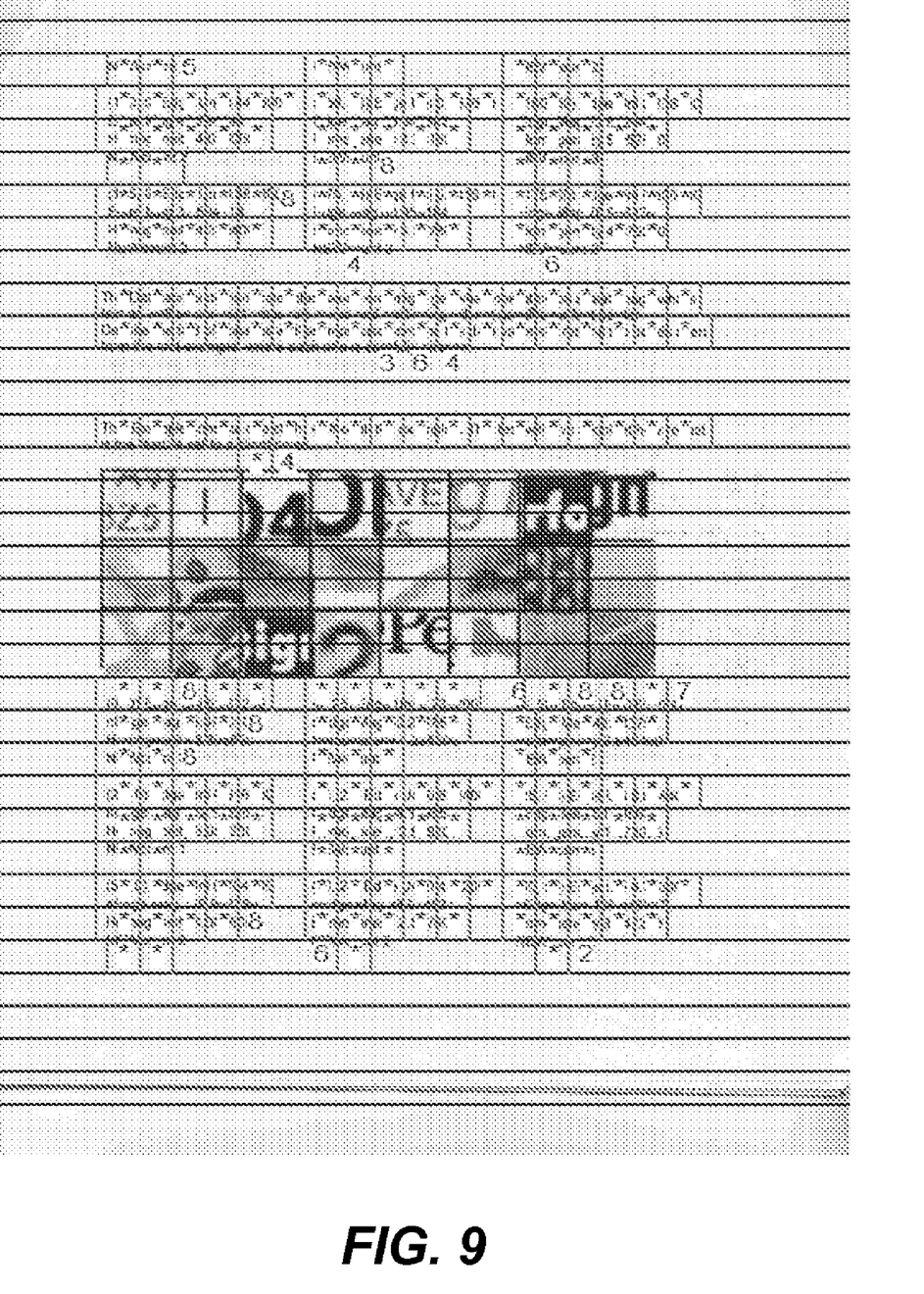

Turning now to FIGS. 8 and 9, an image together with the classification results following processing of the image to identify text content and non-text content regions therein is shown. Text content pixel blocks are identified by the symbol "*". Unclassified pixel blocks are identified by numbers. Each number identifies the level of confidence that the associated pixel block is believed to be a text content pixel block. The confidence level is in the range 1 to 9. As will be appreciated some of the text content pixel blocks are not aligned as a result of border adjusting during post-processing.

It has been found that most pixel blocks can be accurately classified as having text or non-text content with the desired level of confidence using only a subset of the six (6) features when the hybrid classifier 80 is adequately trained. Table 1 below shows the rate at which text and non-text content regions were identified by the hybrid classifier 80 during processing of a sample set of images using different pairs of extracted features.

TABLE 1

| Feature | Feature | Rate (%) |
| --- | --- | --- |
| Magic Square Filter | Background Percentage | 87.8 |
| Magic Square Filter | Uniform Rectangle | 86.1 |
| Magic Square Filter | Average Saturation | 80.1 |
| Magic Square Filter | Edge Density | 76.9 |

As can be seen, the magic square filter results and background pixel percentage allowed pixel blocks to be classified as including text content or non-text content 87.8% of the time with a 90% confidence level. As a result, these features are best suited for inclusion in the first classifier stage 82A. The false negative and false positive rate for this feature pair was 0.48% for text and 0.47% for non-text. As will be appreciated, content such as text or graphic images do not usually exist on an island.

As will be appreciated, on-the fly image content type detection is achieved allowing image enhancement to be performed on appropriate regions of the image. This is in contrast to whole document image analysis which takes into account global statistical features. By segmenting the image into small pixel blocks and using statistical information extracted from the pixel blocks, features of the image which are specific enough to identify content type yet general enough to meet desired simplicity constraints can be used. By using features that are easy to compute, very fast as well as very accurate, classification based on the features can be achieved. Also, use of a hybrid classifier that employs a cascading process in which additional features are extracted and analyzed on a necessity basis ensures high speed classification without compromising accuracy.

If desired, additional features can be extracted from the pixel blocks and analyzed in order to classify pixel blocks. For example, the magnitude of edges in the pixel blocks can be extracted to further improve accuracy at the cost of performance complexity and time. During edge magnitude determination for each pixel block, the edges above the threshold level determined during calculation of the edge density are summed and the sum is divided by the total number of edge pixels in the pixel block. If the total edge magnitude is less than a threshold value, the edge magnitude is set to zero. This feature corresponds to the strength of the edges in the pixel block. Text content tends to have a high edge magnitude and photographs tend to have a low edge magnitude.

Although text and non-text regions are identified in the document images, those of skill in the art will appreciate that different content type regions can be identified through selection of the appropriate extracted image features.

In the examples above, specific linear discriminant functions, threshold levels and a probabilistic distribution table are described and illustrated. Those of skill in the art will appreciate that the linear discriminant functions, threshold levels and probabilistic distribution table values may change to suit the particular environment in which the image scanning device is being employed and the desired accuracy to be achieved.

The content type identifying application may comprise program modules including routines, programs, object components, data structures etc. and be embodied as computer-readable program code stored on a computer-readable medium. The computer-readable medium is any data storage device that can store data, which can thereafter be read by a computer system. Examples of computer-readable medium include for example read-only memory, flash memory, random-access memory, hard disk drives, magnetic tape, CD-ROMs and other optical data storage devices. The computer-readable program code can also be distributed over a network including coupled computer systems so that the computer-readable program code is stored and executed in a distributed fashion.

Although embodiments have been described, those of skill in the art will appreciate that variations and modifications may be made without departing from the spirit and scope thereof as defined by the appended claims.

What is claimed is:

1. A method of identifying regions of different content in an image comprising:
using a processing unit to:
divide image data into a plurality of pixel blocks;
extract features of said pixel blocks; and
classify the content of said pixel blocks based on extracted features; and
wherein said extracting comprises for each pixel block:
convolving a magic square filter with the pixels of the pixel block and summing the results;
calculating the percentage of background pixels in the pixel block;
calculating the edge density of the pixel block; and
calculating the average saturation of the pixel block; and
wherein said classifying comprises:
initially classifying the content of each pixel block based on the magic square filter convolving and summing result and the percentage of background pixels; and
in the event that the content of a pixel block cannot be classified to a desired level of confidence, subsequently classifying the content of the pixel block based on at least one of the calculated edge density and average saturation.

2. The method of claim 1 wherein the extracted features are based on pixel block statistical information.

3. The method of claim 2 wherein said classifying is performed in cascading stages, later stages being employed only when earlier stages are unable to classify the pixel blocks.

4. The method of claim 3 wherein during said classifying, pixel blocks are identified as containing text content or non-text content.

5. The method of claim 4 further comprising:
aggregating connected pixel blocks identified as containing the same content type.

6. The method of claim 4 further comprising:
adjusting the borders of pixel blocks identified as containing text content to inhibit text from being truncated.

7. The method of claim 1 wherein said extracting further comprises for each pixel block:
calculating the number of uniform rectangles in the pixel block.

8. The method of claim 7 wherein, in the event that the pixel block cannot be classified during subsequent classifying, said classifying comprises further subsequently classifying the content of the pixel block based on the calculated edge density and the number of uniform rectangles.

9. The method of claim 8 wherein the average saturation, edge density and number of uniform rectangles are calculated only when subsequent classifying of the pixel block is required.

10. The method of claim 9 wherein during said classifying, pixel blocks are identified as containing text content or non-text content.

11. The method of claim 7 wherein the average saturation and edge density are calculated only when subsequent classifying of the pixel block is required.

12. The method of claim 1 wherein said image data is processed in bands.

13. The method of claim 12 further comprising receiving said bands of image data in a stream from an image scanning device.

14. The method of claim 1 wherein said classifying classifies pixel blocks as containing text content or non-text content.

15. An apparatus for identifying regions of different content in an image comprising:
a processing unit that comprises:
a feature extractor dividing image data into a plurality of pixel blocks and extracting features of said pixel blocks; and
a classifier classifying the content of said pixel blocks based on extracted features; and
wherein said feature extractor determines the results of a magic square filter convolved with each pixel block and at least one of background pixel percentage, edge density, number of uniform rectangles and average saturation thereby to extract said features; and
wherein said classifier initially classifies the content of each pixel block based on the magic square filter convolving results and the background pixel percentage; and in the event that the content of a pixel block cannot be classified to a desired level of confidence, said classifier subsequently classifies the content of the pixel block based on at least one of the calculated edge density and average saturation.

16. An apparatus according to claim 15 wherein said classifier comprises a plurality of classifier stages.

17. An apparatus according to claim 16 wherein said classifier classifies pixel blocks as containing text content or non-text content.

18. An apparatus according to claim 15 wherein said apparatus is at least part of a device selected from the group consisting of a photocopier, a facsimile machine and an all-in-one printer.

19. A non-transitory computer readable medium embodying a computer program for identifying regions of different content in an image, said computer program comprising:
computer program code for dividing image data into a plurality of pixel blocks;
computer program code for extracting features of said pixel blocks; and
computer program code for classifying the content of said pixel blocks based on extracted, features; and
wherein said computer program code for extracting comprises for each pixel block:

computer program code for convolving a magic square filter with the pixels of the pixel block and summing the results;
computer program code for calculating the percentage of background pixels in the pixel block;
computer program code for calculating the edge density of the pixel block; and
computer program code for calculating the average saturation of the pixel block; and
wherein said computer program code for classifying comprises:

computer program code for initially classifying the content of each pixel block based on the magic square filter convolving and summing result and the percentage of background pixels; and
computer program code for, in the event that the content of a pixel block cannot be classified to a desired level of confidence, subsequently classifying the content of the pixel block based on at least one of the calculated edge density and average saturation.

* * * * *

UNITED STATES PATENT AND TRADEMARK OFFICE
CERTIFICATE OF CORRECTION

| | | |
|---|---|---|
| PATENT NO. | : 7,840,071 B2 | Page 1 of 1 |
| APPLICATION NO. | : 11/609718 | |
| DATED | : November 23, 2010 | |
| INVENTOR(S) | : Yichuan Tang et al. | |

It is certified that error appears in the above-identified patent and that said Letters Patent is hereby corrected as shown below:

<u>Column 12,</u>

Line 64, please change "on extracted, features;" to --on extracted features;--

Signed and Sealed this
First Day of March, 2011

David J. Kappos
*Director of the United States Patent and Trademark Office*